Nov. 7, 1961  E. ALBERS-SCHOENBERG  3,007,875
SQUARE LOOP FERRITES
Filed June 23, 1959
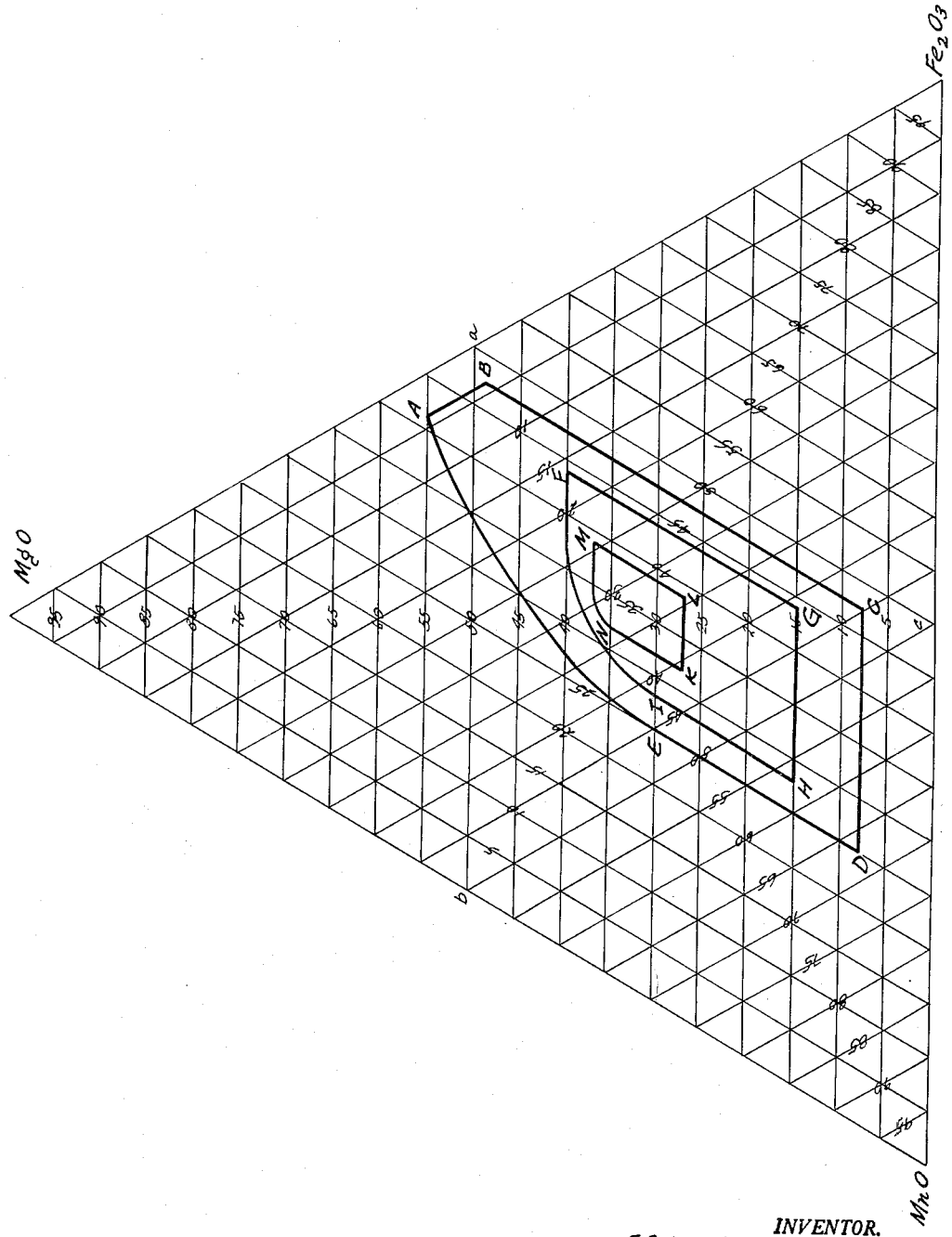
INVENTOR.
ERNST ALBERS-SCHOENBERG
BY
*Green, Pineles & Durr*
ATTORNEYS

3,007,875
SQUARE LOOP FERRITES

Ernst Albers-Schoenberg, Metuchen, N.J., assignor to Steatite Research Corporation, Keasbey, N.J., a corporation of Delaware
Filed June 23, 1959, Ser. No. 822,323
12 Claims. (Cl. 252—62.5)

This invention relates to the production of ferromagnetic ceramic bodies which have hysteresis loops of substantially square or rectangular shape and to the bodies so produced.

Among the objects of the invention is to provide ferromagnetic materials having hysteresis loops which approach very closely to a square or rectangular shape.

Among other objects of the invention is to provide a ceramic type of ferromagnetic material which has a substantially square or rectangular hysteresis loop and a short switching time.

These and other objects ancillary thereto are obtained by making a ceramic ferrite material consisting primarily of a magnesium-manganese ferrite having a deficiency in trivalent iron and having certain other limitations which will be more clearly understood when explained in connection with the accompanying drawing.

The drawing is a triaxial diagram showing within the enclosed areas the mol percent of the magnesia, manganese oxide and ferric oxide components which are suitable to yield square loop materials.

This application is a continuation-in-part of application Serial No. 442,534, filed July 12, 1954, now U.S. Patent No. 2,981,689, which in turn is a continuation-in-part of application Serial No. 270,351, filed February 7, 1952, now abandoned, which in turn is a continuation-in-part of application Serial No. 253,779, filed October 30, 1951, now abandoned, which itself is a continuation-in-part of application Serial No. 67,752, filed December 28, 1948, now abandoned. In the latter application ferromagnetic bodies consisting mainly of bivalent magnesium oxide and trivalent iron oxide, the ratio of the two oxides being between 1.2:1 and 3:1 have been disclosed. In the manufacture of these bodies, the proper ingredients are thoroughly mixed, molded into cores and fired. The resultant products are distinguished by their high insulating properties especially when the firing temperature has not been too high. In order to decrease the firing temperature, a third component, manganese oxide, zinc oxide, or similar fluxing oxide in the proportion of a few percent by weight was proposed. In the application Serial No. 253,779 and in application Serial No. 270,351 it has been explained that bodies of the three-oxide-system $MgO$-$MnO$-$Fe_2O_3$ have a very unusual and interesting property in that they have a rectangular or square hysteresis loop.

The terms rectangular or square hysteresis loop or square loop ferrites require some explanation as these are terms which have been adopted to describe a hysteresis loop which only approaches the square or rectangular shape and the ferrite material which has such a hysteresis loop. The desirable properties which the so-called square loop ferrites exhibit in their hysteresis loops are as follows:

(1) The $B_r/B_s$ ratio should be as close to unity as possible. If the hysteresis loop were absolutely square or rectangular the ratio would be unity but this ideal ratio is practically unattainable. For purpose of this specification the loop is considered to be rectangular or square if the $B_r/B_s$ ratio is about 0.8 or more.

(2) The hysteresis loop should be steep, or in other words the differential permeability $dB/dH$ should be large.

(3) The corners of the hysteresis curve should be sharp, or in other words, there should be a distinct part of sudden directional change in the curve. In use, the sharp cornered materials give an effect similar to the sudden snapping in a mechanical switch and since these ferrites are used to produce effects analogous switching this property is very important.

Other desirable properties are that (4) the coercive force be relatively low and (5) that the saturation flux density be relatively high. The saturation flux density of over 1200 gauss is desirable.

Magnetic materials having these properties have found particular applications in computer and magnetic memory systems.

In magnetic memory systems, cores made of square loop ferrites operate as follows:

The core material is magnetized and then the excitation removed so that the magnetic state of the core is at remanence ($B_r$). If a current pulse of suitable polarity is then applied, which is large enough to reverse the magnetic state of the core, a voltage output on a separate winding can be taken off due to the change of flux in the core. By arranging a set of these magnetic cores in some kind of array, basic numerical data can be stored for use in the core. By arranging a set of these magnetic cores in some kind of array, basic numerical data can be stored for use in mathematical operations. Certain ferromagnetic metals can be used for this purpose if they are very thinly laminated, but the eddy current losses and shielding effects make the response time of these materials relatively long. On the other hand, the "square loop" ferrites with their high resistivities have shortened the response time of magnetic memory systems.

The proportions of the components in the $MgO$-$MnO$-$Fe_2O_3$ system which produce square loop ferrites are those within the area A-B-C-D-E-A of the drawing. It will be seen that such products have a maximum of 47.5 mol percent of iron oxide, a minimum of 8 mol percent of magnesium oxide and a minimum of 4 mol percent of manganese oxide; these values enclosing three sides of a four-sided area. The fourth side D-E-A is not a straight line. The minimum amount of iron oxide as shown by portion D-E of side D-E-A is 25 mol percent but when the amount of magnesia is increased beyond about 20 mol percent the minimum proportion of iron oxide must also be increased. When the amount of magnesia is increased to 40 mol percent, for example, the iron oxide must have a minimum proportion of 28 mol percent. At 45 mol percent of $MgO$ the iron oxide must be a minimum of about 30 mol percent; at 50 mol percent of magnesia the iron oxide must be at a minimum of about 34 mol percent; and at 55 mol percent of magnesia (the maximum $MgO$ permissible under any conditions) the iron oxide must be at a minimum of about 41 mol percent.

A preferred range of mol percentage of the components is within the area F-G-H-I-F. This area is bound by straight lines F-G showing a maximum of 44% of iron oxide, straight line G-H showing a minimum of 15% of MgO, straight line H-I showing a minimum of 28% of iron oxide: and curved line I-F which indicates that the amount of magnesia may increase to a maximum of about 40 mol percent when the iron oxide content is between 37 and 44%.

Within this area good square loop proportions are found. There is a smaller area, indicated by the letters K-L-M-N where the effect of a short switching time is very pronounced. This area is bound by straight lines L-M showing a maximum of 39 mol percent of iron oxide, straight line K-L showing a minimum of 27% of MgO, straight line K-N showing a minimum of 32% iron oxide, and curved line N-M which indicates that the amount of magnesia may increase to a maximum of 37 mol percent when the iron oxide content is between 35 and 39%.

Examples of metal oxides which can be substituted for a portion of the magnesia or manganese oxide are bivalent metal oxides consisting of copper oxide, nickel oxide, zinc oxide, cadmium oxide, calcium oxide, and the univalent lithium oxide.

These oxides can be added in maximum amounts of about 5% by weight, except for ZnO, where the maximum may be a little higher, up to 8%. Higher percentages must be strictly avoided. As increasing amounts of zinc oxide are added to such compositions, for example, the corners of the hysteresis loop begin to round off. Additional fluxing may be obtained also by substituting magnesium fluoride for a portion of the magnesium oxide.

This application is distinguished from application Serial No. 442,534 in that it relates specifically to the products prepared by the addition of 0.3 to 4 mol percent of silica. Such products not only have improved insulating properties but they are found to have a shorter switching time under stronger driving conditions. The shorter switching time is believed to be due to the fact that the silica additions increase the coercive force of the resultant ferromagnetic materials and/or in that the said additions reduce the crystal growth during firing.

As an example, a ferrite with the molecular composition 33.5 mol percent of ferric oxide, 33 mol percent of manganese oxide calculated as MnO, and 33.5 mol percent of magnesium oxide will have a switching time of 1.2 microseconds at its optimum driving field of 2.86 oersteds whereas a ferrite made of approximately the same formula but containing 0.65 mol percent silicon dioxide under the optimum conditions of molding, firing and treating will have a switching time of 0.79 microsecond, under its optimum driving field of 4.38 oersteds. Another example is a ferrite with the molecular composition 35.5% ferric oxide, 29.2% of manganese oxide calculated as MnO, 1.2% zinc oxide and 34.1% magnesium oxide. It has a switching time of 0.56 microsecond at its optimum driving field of 2.60 oersteds; while a ferrite of the same composition but containing 0.65% silicon dioxide under its optimum condition of molding, firing and treating has a switching time of 0.38 microsecond under its optimum driving field of 3.31 oersteds.

As is indicated in Tables II and III, there are several other advantages in addition to the faster switching and peaking times. Two very important parameters in the selection of ferrite cores to be used as computer elements are the signal to noise ratio ($uV_1:dVz$) and the amplitude of the maximum allowable half-selecting field ($I_d$). It is desirable to have both these quantities as large as possible, and it will be seen from the examples described below that the silicon dioxide addition to Examples 2 and 4 improves these parameters over Examples 1 and 3.

In the following examples the components are listed consistently as MgO, $MnO_2$, $Fe_2O_3$, ZnO, etc. $MnO_2$ has been chosen as prototype of a manganese oxide, because it is available as a pure reagent of a well defined oxygen content. It goes without saying, that in accordance with general rules of ceramic chemistry, other compounds may be used just as well, thus, for instance $MgCO_3$ instead of MgO, or $Mn_3O_4$ instead of $MnO_2$. ($MnO_2$ decomposes in the firing process and the manganese component in the fired body is an oxide of lower oxygen content, MnO or $Mn_3O_4$.)

The specific examples illustrate how the products are prepared and fired and set forth the essential properties of typical compositions.

EXAMPLE I

A mix is prepared of the following ingredients, in the proportions indicated:

|  | Percent by weight | Mol Percent |
| --- | --- | --- |
| MgO | 14.26 | 33.5 |
| $MnO_2$ | 29.86 | 33.0 |
| $Fe_2O_3$ | 55.88 | 33.5 |

The mix is wet ball milled to obtain a finely divided and thoroughly mixed composition.

This mix is calcined at a temperature of 1775° F. to promote the solid-state reaction and again wet ball milled. To this powder a small amount of binder, such as polyvinyl alcohol and water are added and the material is shaped by pressing. The product is fired in air at 2500° F. and subsequently annealed at a temperature of 2100° F. in a neutral gas such as $N_2$. The product has the following properties:

Induction ($B_m$) at 5 oe. (oersteds) = 2100 gauss
Residual magnetization ($B_r$) at 5 oe. = 1810 gauss
$B_r/B_m$ at 5 oe. = .905
Coercivity ($H_c$) at 5 oe. = 1.26 oersteds

EXAMPLE II

A shaped body is made in accordance with the process set forth in the foregoing description with the following starting materials.

|  | Percent by weight | Mol Percent |
| --- | --- | --- |
| MgO | 14.18 | 33.5 |
| $MnO_2$ | 29.71 | 33.0 |
| $Fe_2O_3$ | 55.59 | 33.5 |
| $SiO_2 \cdot nH_2O$ | 0.52 | 0.65 |

The pressed core is fired in air at 2450° F. and subsequently annealed at a temperature of 2100° F. in a neutral gas such as $N_2$. The product has the following properties:

Induction ($B_m$) at 5 oe. = 1815 gauss
Residual magnetization ($B_r$) at 5 oe. = 1630 gauss
$B_r/B_m$ at 5 oe. = .898
Coercivity at 5 oe. = 1.98 oersteds

EXAMPLE III

A shaped body is made in accordance with the process set forth in Example I with the following starting materials:

|  | Percent by weight | Mol Percent |
| --- | --- | --- |
| MgO | 14.30 | 34.1 |
| $MnO_2$ | 26.12 | 29.2 |
| ZnO | 1.03 | 1.2 |
| $Fe_2O_3$ | 58.55 | 35.5 |

The pressed core (pressed without any water) is fired in air at 2400° F. and subsequently annealed at 2100° F. in a neutral gas such as $CO_2$. The product has the following properties:

Induction ($B_m$) at 3.94 oe. = 1640 gauss
Residual magnetization ($B_r$) at 3.94 oe. = 1435 gauss
$B_r/B_m$ at 3.94 oe. = .875
Coercivity at 3.94 oe. = 1.67 oe.

EXAMPLE IV

A shaped body is made in accordance with the process set forth in Example I with the following starting materials:

|  | Percent by weight | Mol Percent |
|---|---|---|
| MgO | 14.23 | 34.1 |
| MnO$_2$ | 25.98 | 29.2 |
| ZnO | 1.02 | 1.2 |
| SiO$_2$.nH$_2$O | 0.51 | 0.65 |
| Fe$_2$O$_3$ | 58.25 | 35.5 |

The pressed core (pressed without any water) is fired in air at 2380° F. and subsequently annealed at 2100° F. in a neutral gas such as CO$_2$. The product has the following properties:

Induction ($B_m$) at 3.94 oe.=1450 gauss
Residual magnetization ($B_r$) at 3.94 oe.=1310 gauss
$B_r/B_m$ at 3.94 oe.=.903
Coercivity at 3.94 oe.=2.12 oe.

EXAMPLE V

A shaped body is made in accordance with the process set forth in Example I with the following starting materials:

|  | Percent by weight | Mol Percent |
|---|---|---|
| MgO | 14.05 | 34.1 |
| MnO$_2$ | 21.02 | 23.9 |
| ZnO | 3.70 | 4.5 |
| SiO$_2$.H$_2$O | 0.51 | 0.65 |
| Fe$_2$O$_3$ | 60.73 | 37.5 |

The pressed core (pressed without any water) is fired in air at 2380° F. and subsequently annealed at 2100° F. in a neutral gas such as CO$_2$. The product has the following properties:

Induction ($B_m$) at 3.94 oe.=2070 gauss
Residual magnetization ($B_r$) at 3.94 oe.=1795 gauss
$B_r/B_m$ at 3.94 oe.=.868
Coercivity at 3.94 oe.=2.02 oe.

EXAMPLE VI

A shaped body is made in accordance with the process set forth in Example I with the following starting materials:

|  | Percent by weight | Mol Percent |
|---|---|---|
| MgO | 13.78 | 34.1 |
| MnO$_2$ | 23.38 | 27.2 |
| ZnO | .99 | 1.2 |
| SiO$_2$.H$_2$O | 1.46 | 1.95 |
| Fe$_2$O$_3$ | 60.39 | 37.5 |

The pressed core (pressed without any water) is fired in air at 2380° F. and subsequently annealed at 2100° F. in a neutral gas such as CO$_2$. The product has the following properties:

Induction ($B_m$) at 5.9 oe.=2270 gauss
Residual magnetization ($B_r$) at 5.9 oe.=1825 gauss
$B_r/B_m$ at 5.9 oe.=.803
Coercivity at 5.9 oe.=3.14 oe.

The properties of the examples are compared in Tables 1–3 below.

Table I

MOLECULAR FORMULA

| Example | MgO, Mol Percent | MnO, Mol Percent | ZnO, Mol Percent | SiO$_2$, Mol Percent | Fe$_2$O$_3$, Mol Percent |
|---|---|---|---|---|---|
| 1 | 33.5 | 33.0 | 0 | 0 | 33.5 |
| 2 | 33.5 | 33.0 | 0 | 0.65 | 33.5 |
| 3 | 34.1 | 29.2 | 1.2 | 0 | 35.5 |
| 4 | 34.1 | 29.2 | 1.2 | 0.65 | 35.5 |
| 5 | 34.1 | 23.9 | 4.5 | 0.65 | 37.5 |
| 6 | 34.1 | 27.2 | 1.2 | 1.95 | 37.5 |

Table II

| Example (Body) No. | Size O.D., cm. | Size I.D., cm. | H, cm. | Exciting Field, amp. | oe. | Signal Volt.-uV$_1$ v./oe. cm.$^2$ | Noise Volt.-dVz v./oe. cm.$^2$ | Signal Noise Ratio, Uv$_1$/dVz |
|---|---|---|---|---|---|---|---|---|
| 1 | .58 | .29 | .22 | 1.98 | 1.82 | 13.26 | 3.42 | 3.88 |
| 2 | .57 | .29 | .22 | 3.00 | 2.785 | 11.79 | 2.52 | 4.68 |
| 3 | .127 | .076 | .036 | .66 | 2.60 | 30.3 | 6.35 | 4.77 |
| 4 | .127 | .076 | .036 | .84 | 3.31 | 33.4 | 5.6 | 5.94 |
| 5 | .127 | .076 | .036 | .77 | 3.07 | 46.7 | 5.04 | 9.26 |
| 6 | .127 | .076 | .036 | 1.00 | 3.94 | 37.5 | 4.65 | 8.07 |

Table III

| Example | Peak Time, μsec. | Switch Time, μsec. | Maximum Allowable Half-Selecting Field I$_d$ amp. | Maximum Allowable Half-Selecting Field I$_d$ oe. | Percent Total Exciting Field |
|---|---|---|---|---|---|
| 1 | 0.48 | 1.21 | 1.05 | 1.52 | 53.0 |
| 2 | 0.31 | 0.79 | 1.75 | 2.56 | 58.4 |
| 3 | 0.27 | 0.56 | .377 | 1.485 | 57.1 |
| 4 | 0.18 | 0.39 | .522 | 2.06 | 62.1 |
| 5 | 0.25 | 0.49 | .470 | 1.88 | 61.1 |
| 6 | 0.22 | 0.38 | .670 | 2.64 | 67.0 |

It will be noted especially that the switching time is shorter and signal to noise ratio is higher in the silica containing cores than in cores of similar composition without such addition.

The features and principles underlying the invention described above in connection with specific exemplifications will suggest to those skilled in the art many other modifications thereof. It is accordingly desired that the appended claims shall not be limited to any specific feature or details thereof.

I claim:

1. A ferromagnetic ferrite body having a square hysteresis loop consisting essentially of a manganese-magnesium ferrite consisting essentially of the following ingredients in the proportions stated:

|  | Mol percent |
|---|---|
| MgO | 8–55 |
| MnO | 4–67 |
| Fe$_2$O$_3$ | 25–47.5 |
| Silica | 0.3–4.0 | the proportions of said magnesium oxide, manganese oxide and ferric oxide being within area ABCDEA of the drawing.

2. The ferrite composition as defined in claim 1 in which the proportions of magnesium oxide, manganese oxide and ferric oxide are within area FGHIF of the drawing.

3. The ferrite composition as defined in claim 1 in which the proportions of magnesium oxide, manganese oxide and ferric oxide are within area KLMNK of the drawing.

4. A ferromagnetic ferrite composition having a square hysteresis loop consisting essentially of a manganese-magnesium ferrite consisting essentially of the following ingredients in the proportions stated:

| | |
|---|---|
| MgO | 8–55 mol percent. |
| MnO | 4–67 mol percent. |
| $Fe_2O_3$ | 25–47.5 mol percent. |
| Silica | 0.3–4.0 mol percent. |
| Additional bivalent heavy metal oxide | 0–5% by weight of the composition. | the proportions of MgO, MnO, and $Fe_2O_3$ being within area ABCDEA of the drawing.

5. The ferrite composition as set forth in claim 4 in which the proportions of MgO, MnO and $Fe_2O_3$ are within area FGHIF of the drawing.

6. The ferrite composition as set forth in claim 4 in which the proportions of MgO, MnO and $Fe_2O_3$ are within area KLMNK of the drawing.

7. A ferromagnetic ferrite composition having a square hysteresis loop consisting essentially of a manganese-magnesium ferrite consisting essentially of the following ingredients in the proportions stated:

| | |
|---|---|
| MgO | 8–55 mol percent. |
| MnO | 4–67 mol percent. |
| $Fe_2O_3$ | 25–47.5 mol percent. |
| Silica | 0.3–4.0 mol percent. |
| ZnO | 0–8% by weight of the composition. | the proportions of MgO, MnO, and $Fe_2O_3$ being within area ABCDEA of the drawing.

8. The ferrite composition as set forth in claim 7 in which the proportions of MgO, MnO and $Fe_2O_3$ are within area FGHIF of the drawing.

9. The ferrite composition as set forth in claim 7 in which the proportions of MgO, MnO and $Fe_2O_3$ are within area KLMNK of the drawing.

10. A ferromagnetic ferrite composition having a square hysteresis loop consisting essentially of a manganese-magnesium ferrite consisting essentially of the following ingredients in the proportions stated:

| | |
|---|---|
| MgO | 8–55 mol percent. |
| MnO | 4–67 mol percent. |
| $Fe_2O_3$ | 25–47.5 mol percent. |
| Additional bivalent heavy metal oxide | 0–5% by weight of the composition. |
| Silica | 0.3–4.0 mol percent. |
| Fluoride of at least one of the metals of said composition | 0–5% by weight of the composition. | the proportions of MgO, MnO and $Fe_2O_3$ being within area ABCDEA of the drawing.

11. The ferrite composition as set forth in claim 10 in which the proportion of MgO, MnO and $Fe_2O_3$ are within area FGHIG of the drawing.

12. The ferrite composition as set forth in claim 10 in which the proportion of MgO, MnO and $Fe_2O_3$ are within area KLMNK of the drawing.

References Cited in the file of this patent

UNITED STATES PATENTS

| | | |
|---|---|---|
| 1,821,208 | Dahlberg | Sept. 1, 1931 |
| 2,565,111 | Albers-Schoenberg | Aug. 21, 1951 |
| 2,640,813 | Berge | June 2, 1953 |
| 2,736,708 | Crowley | Feb. 28, 1956 |

FOREIGN PATENTS

| | | |
|---|---|---|
| 671,788 | Great Britain | May 7, 1952 |
| 697,219 | Great Britain | Sept. 16, 1953 |
| 735,375 | Great Britain | Aug. 17, 1955 |
| 737,284 | Great Britain | Sept. 21, 1955 |
| 288,866 | Switzerland | June 1, 1953 |